US010095357B2

(12) United States Patent
Imai

(10) Patent No.: US 10,095,357 B2
(45) Date of Patent: Oct. 9, 2018

(54) POSITION DETECTION DEVICE, DISPLAY DEVICE, METHOD OF CONTROLLING POSITION DETECTION DEVICE, AND METHOD OF CONTROLLING DISPLAY DEVICE FOR DETECTING A POSITION ON A DISPLAY SURFACE

(71) Applicant: SEIKO EPSON CORPORATION, Tokyo (JP)

(72) Inventor: Shun Imai, Matsumoto-Shi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 122 days.

(21) Appl. No.: 15/070,606

(22) Filed: Mar. 15, 2016

(65) Prior Publication Data

US 2016/0283041 A1  Sep. 29, 2016

(30) Foreign Application Priority Data

Mar. 23, 2015  (JP) ................................ 2015-059370

(51) Int. Cl.
G06F 3/042 (2006.01)
G06F 3/038 (2013.01)
G06F 3/0354 (2013.01)

(52) U.S. Cl.
CPC .......... *G06F 3/0425* (2013.01); *G06F 3/0386* (2013.01); *G06F 3/03545* (2013.01); *G06F 2203/04104* (2013.01)

(58) Field of Classification Search
CPC .. G06F 3/0386; G06F 3/03545; G06F 3/0425; G06F 2203/04104
See application file for complete search history.

(56) References Cited

U.S. PATENT DOCUMENTS

| 8,274,534 | B2 * | 9/2012 | Montague | G06F 3/04845 345/418 |
| 2010/0214215 | A1 * | 8/2010 | Benenson | G06F 3/0346 345/158 |
| 2015/0331536 | A1 * | 11/2015 | Miyakawa | G06F 3/0416 345/173 |
| 2017/0038852 | A1 * | 2/2017 | Hildreth | G06F 3/017 |

FOREIGN PATENT DOCUMENTS

JP  2011-203816 A  10/2011

* cited by examiner

*Primary Examiner* — Kwang-Su Yang
(74) *Attorney, Agent, or Firm* — Oliff PLC

(57) ABSTRACT

A position detection device includes a detection section adapted to detect an operation to a screen, a detection control section adapted to identify the pointing element with which the operation is performed, and associate the operation with the pointing element, and a processing section adapted to process the operation associated with the pointing element out of the operations. In the case in which a first operation and a second operation, which is performed within a predetermined period of time before the first operation, with a single pointing element are detected, and a coordinate of the first operation and a coordinate of the second operation are located within a predetermined range, the detection control section treats the coordinate of the first operation as the same coordinate as the coordinate of the second operation. Further, the detection control section changes the predetermined range in accordance with the detection position in the screen.

6 Claims, 6 Drawing Sheets

| PHASE | 1<br>SYNCHRO-<br>NIZATION | 2<br>POSITION<br>DETECTION | 3<br>POINTING<br>ELEMENT<br>DETERMI-<br>NATION | 4<br>POSITION<br>DETECTION | 1<br>SYNCHRO-<br>NIZATION | 2<br>POSITION<br>DETECTION | ... |
|---|---|---|---|---|---|---|---|
| (A) PROJECTOR (FOR SYNCHRONIZATION) | ▨ | | | | ▨ | | ... |
| (B) POINTING ELEMENT | | ▨ | ▨ | ▨ | | ▨ | ... |
| (C) LIGHT EMITTING DEVICE | | ▨▨▨ | | ▨▨▨ | | ▨▨▨ | ... |

FIG. 3

POSITION DETECTION DEVICE, DISPLAY DEVICE, METHOD OF CONTROLLING POSITION DETECTION DEVICE, AND METHOD OF CONTROLLING DISPLAY DEVICE FOR DETECTING A POSITION ON A DISPLAY SURFACE

The entire disclosure of Japanese Patent Application No. 2015-059370, filed Mar. 23, 2015 is expressly incorporated by reference herein.

BACKGROUND

1. Technical Field

The present invention relates to a position detection device, a display device, a method of controlling a position detection device, and a method of controlling a display device.

2. Related Art

In the past, there has been known a position detection device for detecting an operation to a display surface (see, e.g., JP-A-2011-203816 (Document 1)). The coordinate input device of Document 1 is a coordinate input device for detecting operation input to the operation screen, and corrects the coordinate so that a single click operation or a double click operation is easy to recognize even if wobbling of a motion of a hand of a human or a displacement of the input due to parallax or a shadow occurs when performing the click operation or the double click operation using an electronic pen, a hand, or the like.

However, in pointing an operation to the display surface using a pointing element, it is not necessarily possible for the operator to point the position, which the operator wants to point, without fail. For example, in the case of operating the pointing element standing up, if the operator is not used to the operation with the pointing element, the arm of the operator is not fixed when performing the operation, and therefore, it is difficult to point the target position. Further, in the case of the configuration in which the pointed position on the display surface pointed by the pointing element is detected by a detection section, the error included in the pointed position detected by the detection section differs by the pointed position on the display surface thus pointed in some cases, and therefore, it is difficult to accurately detect the position pointed by the pointing element.

SUMMARY

An advantage of some aspects of the invention is to provide a position detection device, a display device, a method of controlling a position detection device, and a method of controlling a display device each improved in operability of the operation with a pointing element.

A position detection device according to an aspect of the invention includes a detection section adapted to detect an operation to a display surface, an identification section adapted to identify a pointing element with which the operation detected by the detection section is performed, and associate the operation and the pointing element with each other, and a processing section adapted to process the operation associated with the pointing element out of the operations detected by the detection section, and in a case in which a first operation and a second operation, which is performed within a predetermined period of time before the first operation, with a single pointing element are detected, and a coordinate of the first operation and a coordinate of the second operation are located within a predetermined range, the identification section treats the coordinate of the first operation as the same coordinate as the coordinate of the second operation, and the identification section changes a predetermined range in accordance with a detection position in the display surface of the operation detected by the detection section.

According to this aspect of the invention, it is possible to improve the operability of the operation with the pointing element.

According to another aspect of the invention, in the position detection device described above, the identification section determines whether or not the coordinate of the first operation is treated as the same coordinate as the coordinate of the second operation in accordance with configuration information set so that the range set to a first position in the display surface is larger than the range set to a second position located above the first position.

According to this aspect of the invention, in the lower part of the display surface, it is possible to increase the possibility that the coordinates pointed with the pointing element are determined as the same coordinate despite the variation.

According to another aspect of the invention, in the position detection device described above, the identification section determines whether or not the coordinate of the first operation is treated as the same coordinate as the coordinate of the second operation in accordance with configuration information set so that the range set to a first position in the display surface is larger than the range set to a second position located closer to the detection section than the first position.

According to this aspect of the invention, even in the case in which the positions distant from the detection section are pointed with the pointing element, and there is a variation in the coordinates thus pointed, it is possible to increase the possibility that the coordinates are determined as the same coordinate.

According to another aspect of the invention, in the position detection device described above, there is further included an emission section installed in a top part of the display surface, and adapted to emit detection light used to detect the pointing element, and the detection section is installed in the top part of the display surface, and shoots the detection light reflected by the pointing element, with which the operation to the display surface is performed, to detect the operation to the display surface with the pointing element.

A display device according to still another aspect of the invention includes a display section adapted to display an image on a display surface, a detection section adapted to detect an operation to the display surface, an identification section adapted to identify a pointing element with which the operation detected by the detection section is performed, and associate the operation and the pointing element with each other, and a processing section adapted to process the operation associated with the pointing element out of the operations detected by the detection section, and in a case in which a first operation and a second operation, which is performed within a predetermined period of time before the first operation, with a single pointing element are detected, and a coordinate of the first operation and a coordinate of the second operation are located within a predetermined range, the identification section treats the coordinate of the first operation as the same coordinate as the coordinate of the second operation, and the identification section changes a predetermined range in accordance with a detection position in the display surface of the operation detected by the detection section.

According to this aspect of the invention, it is possible to improve the operability of the operation with the pointing element.

A method of controlling a position detection device according to yet another aspect of the invention includes detecting an operation to a display surface, identifying a pointing element with which the operation detected in the detecting is performed, and associating the operation and the pointing element with each other, and processing the operation associated with the pointing element out of the operations detected in the detecting, and, in a case in which a first operation and a second operation, which is performed within a predetermined period of time before the first operation, with a single pointing element are detected, and a coordinate of the first operation and a coordinate of the second operation are located within a predetermined range, the coordinate of the first operation is treated as the same coordinate as the coordinate of the second operation in the identifying, and a predetermined range is changed in accordance with a detection position in the display surface of the operation detected in the detecting.

According to this aspect of the invention, it is possible to improve the operability of the operation with the pointing element.

A method of controlling a display device according to still yet another aspect of the invention includes displaying an image on a display surface, detecting an operation to the display surface, identifying a pointing element with which the operation detected in the detecting is performed, and associating the operation and the pointing element with each other, and processing the operation associated with the pointing element out of the operations detected in the detecting, and, in a case in which a first operation and a second operation, which is performed within a predetermined period of time before the first operation, with a single pointing element are detected, and a coordinate of the first operation and a coordinate of the second operation are located within a predetermined range, the coordinate of the first operation is treated as the same coordinate as the coordinate of the second operation in the associating, and a predetermined range is changed in accordance with a detection position in the display surface of the operation detected in the detecting.

According to this aspect of the invention, it is possible to improve the operability of the operation with the pointing element.

BRIEF DESCRIPTION OF THE DRAWINGS

The invention will be described with reference to the accompanying drawings, wherein like numbers reference like elements.

FIG. 3 is a diagram showing a communication sequence of a projector, a first pointing element, and a light emitting device.

DESCRIPTION OF EXEMPLARY EMBODIMENTS

First Embodiment

An embodiment of the invention will hereinafter be described with reference to the accompanying drawings.

Figure 1:
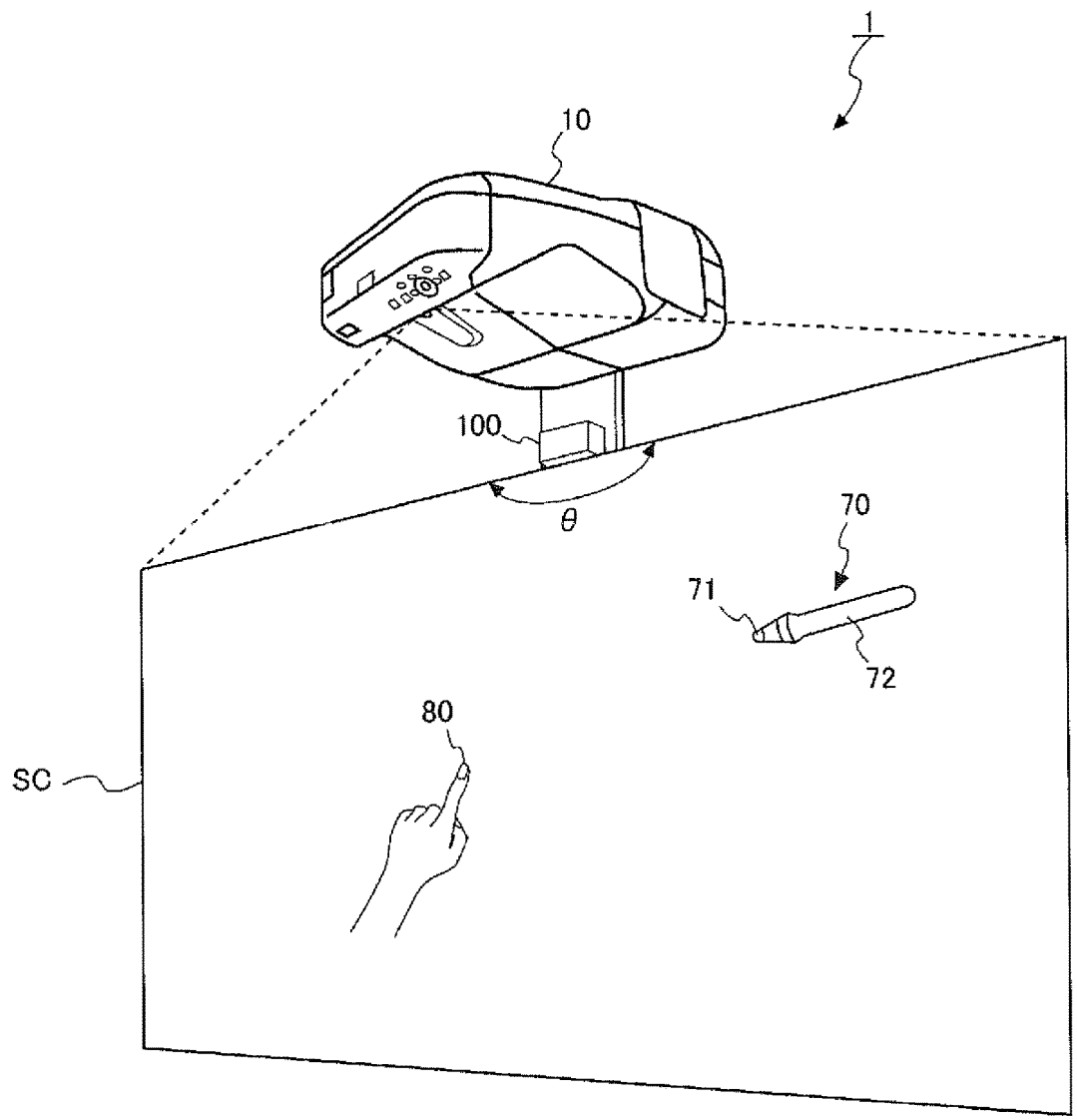
FIG. 1 is a schematic configuration diagram of a projection system.

FIG. 1 is a diagram showing a configuration of a projection system 1 according to the embodiment to which the invention is applied. The projection system 1 is provided with a projector 10 disposed above a screen SC (display surface), and a light emitting device 100 installed in a top part of the screen SC.

The projector 10 is disposed directly above or obliquely above the screen SC, and projects an image toward the screen SC located obliquely below. Further, the screen SC illustrated in the present embodiment is a flat plate or a curtain fixed to a wall surface, or erected on the floor surface. Further, the display surface is not limited to the screen SC, and it is also possible to use the wall surface as the screen SC. In this case, it is preferable to attach the projector 10 and the light emitting device 100 to an upper part of the wall surface used as the screen SC.

The projection system 1 detects an operation of the operator to the screen SC. In the operation to the screen SC, there can be used a first pointing element 70 having a pen-like shape or a second pointing element 80 as a hand finger of the operator. The first pointing element 70 is operated so that a tip portion 71 has contact with the screen SC with a sleeve section 72 having a rod-like shape held by the operator in hand.

Figure 2:
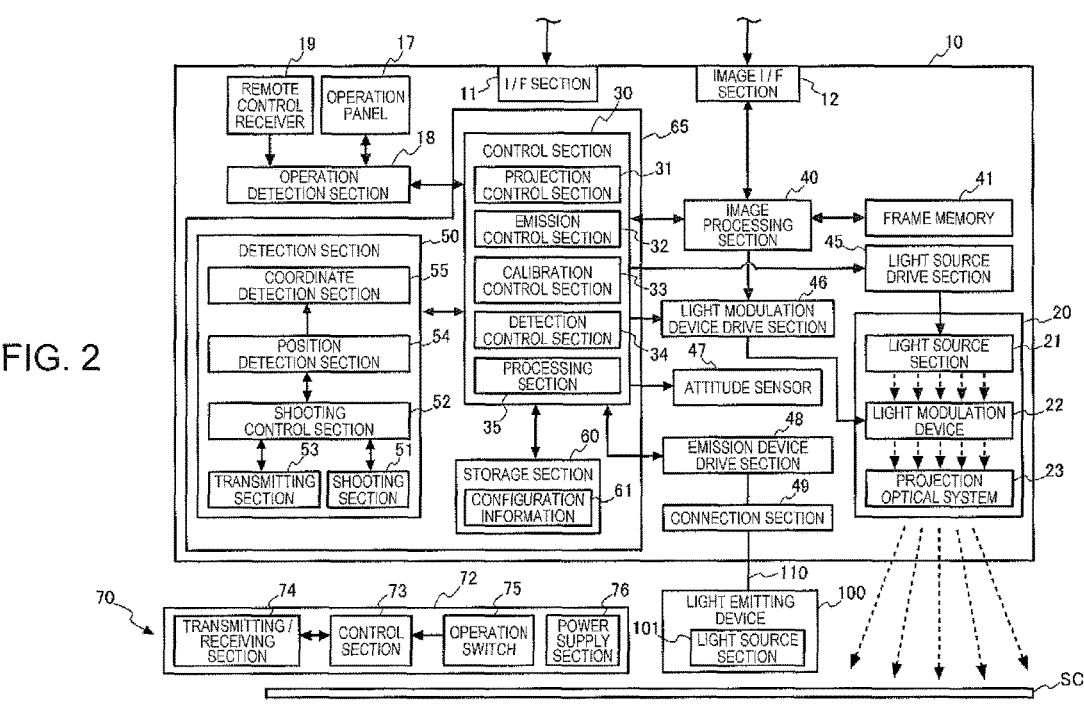
FIG. 2 is a functional block diagram of the projection system.

FIG. 2 is a functional block diagram of a variety of sections constituting the projection system 1. Firstly, a configuration of the first pointing element 70 will be described.

The first pointing element 70 is provided with a control section 73, a transmitting/receiving section 74, an operation switch 75, and a power supply section 76. The control section 73, the transmitting/receiving section 74 and the power supply section 76 are housed in the sleeve section 72.

The transmitting/receiving section 74 is provided with a light source such as an infrared LED, and a light receiving element for receiving infrared light (an infrared signal), puts ON/OFF the light source in accordance with control by the control section 73, and outputs a signal representing the light reception state of the light receiving element to the control section 73.

The operation switch 75 is incorporated in the tip portion 71 of the first pointing element 70, and turns ON in the case in which the tip portion 71 of the first pointing element 70 has contact with the wall or the screen SC to thereby be pressed.

The control section 73 is connected to the transmitting/receiving section 74 and the operation switch 75, and detects one of an ON state and an OFF state of the operation switch 75. The control section 73 makes a lighting pattern of the light source provided to the transmitting/receiving section 74 different between the case in which the operation switch 75 is in the ON state and the case in which the operation switch 75 is in the OFF state. The projector 10 detects the position of the tip portion 71 based on the infrared light (the infrared signal) emitted by the first pointing element 70. Further, the projector 10 determines whether or not the first pointing element 70 is pressed against the wall or the screen SC based on the lighting pattern of the infrared light emitted by the first pointing element 70.

The power supply section 76 has a dry battery or a secondary cell as a power source, and supplies the electric power to each of the sections, namely the control section 73, the transmitting/receiving section 74, and the operation switch 75. The first pointing element 70 is provided with a power switch (not shown) for switching ON/OFF the power supply from the power supply section 76.

Then, a configuration of the projector 10 will be described.

The projector 10 is connected to an image supply device (not shown) such as a personal computer (PC), a video reproduction device, a DVD reproduction device, or a Blu-ray (registered trademark) disc reproduction device. The projector 10 projects an image on the screen SC based on an analog image signal or digital image data supplied from the image supply device. Further, it is also possible for the projector 10 to read out the image data stored in a storage section 60 incorporated in the projector 10 or a storage medium externally connected to the projector 10, and then display an image on the screen SC based on the image data.

The projector 10 is provided with an I/F (interface) section 11 and an image I/F (interface) section 12 as interfaces to be connected to external devices. It is also possible for the I/F section 11 and the image I/F section 12 to be provided with connecters for wired connection, and each provided with an interface circuit compatible with the connector described above. Further, the I/F section 11 and the image I/F section 12 each can also be provided with a wireless communication interface. As the connector and the interface circuit for the wired connection, there can be cited those compliant to wired LAN, IEEE1394, USB, or the like. Further, as the wireless interface, there can be cited those compliant to wireless LAN, Bluetooth (registered trademark), or the like. As the image I/F section 12, there can also be used an interface for image data such as an HDMI (registered trademark) interface. The image I/F section 12 can also be provided with an interface through which sound data is input.

The I/F section 11 is an interface for transmitting and receiving a variety of types of data with an external device such as a PC. The I/F section 11 inputs and outputs control data related to projection of an image, configuration data for setting the operation of the projector 10, a coordinate of a pointed position detected by the projector 10, and so on. The control section 30 described later transmits and receives data with an external device via the I/F section 11.

The image I/F section 12 is an interface through which the digital image data is input. The projector 10 according to the present embodiment projects an image based on the digital image data input via the image I/F section 12. It should be noted that the projector 10 can also be provided with a function of projecting an image based on the analog image signal, and in this case, the image I/F section 12 can be provided with an interface for an analog image signal, and an A/D conversion circuit for converting the analog image signal into digital image data.

The projector 10 is provided with a projection section 20 for performing formation of an optical image. The projection section 20 is provided with a light source section 21, a light modulation device 22, and a projection optical system 23. The light source section 21 is provided with a light source formed of a xenon lamp, a super-high pressure mercury lamp, a light emitting diode (LED), a laser source, or the like. Further, the light source section 21 can also be provided with a reflector and an auxiliary reflector for guiding the light emitted by the light source to the light modulation device 22. Further, a lens group (not shown) for enhancing the optical characteristics of the projection light, a polarization plate, a dimming element for reducing the light intensity of the light emitted by the light source on a path leading to the light modulation device 22, and so on can also be provided.

The light modulation device 22 is provided with, for example, three transmissive liquid crystal panels corresponding respectively to the three primary colors of RGB, and modulates the light to be transmitted through the liquid crystal panels to thereby generate the image light. The light from the light source section 21 is separated into colored light beams of three colors of RGB, and the colored light beams enter the corresponding liquid crystal panels, respectively. The colored light beams, which have been modulated while passing through the respective liquid crystal panels, are combined by a combining optical system such as a cross dichroic prism, and are then output to the projection optical system 23.

The projection optical system 23 is provided with a lens group for guiding the image light, which has been modulated by the light modulation section 22, toward the screen SC to form the image on the screen SC. Further, the projection optical system 23 can also be provided with a zoom mechanism for performing expansion/contraction of the projection image on the screen SC, and a focus adjustment mechanism for performing an adjustment of the focus. In the case in which the projector 10 is of a short focus type, it is also possible to provide the projection optical system 23 with a concave mirror for reflecting the image light toward the screen SC.

To the projection section 20, there are connected a light source drive section 45 for lighting the light source section 21 in accordance with the control by the control section 30, and a light modulation device drive section 46 for operating the light modulation device 22 in accordance with the control by the control section 30. The light source drive section 45 can also be provided with a function of switching between lighting and extinction of the light source section 21 to control the light intensity of the light source section 21.

The projector 10 is provided with an image processing system for processing the image to be projected by the projection section 20. The image processing system includes the control section 30 for controlling the projector 30, the storage section 60, an image processing section 40, and a frame memory 41. The projector 10 is provided with an operation panel 17, an operation detection section 18, a remote control receiver 19, a detection section 50, an attitude sensor 47, an emission device drive section 48, a connection section 49. The control section 30 and the detection section 50 constitute a position detection device 65.

The control section 30 is provided with hardware such as a CPU, a ROM, and a RAM, and controls the projector 10 by the CPU executing a basic control program stored in the ROM and a control program stored in the storage section 60. Further, the control section 30 executes the control program stored in the storage section 60 to thereby function as a projection control section 31, an emission control section 32, a calibration control section 33, a detection control section (an identification section) 34, and a processing section 35. The detailed explanation of each of the functional blocks will be described later.

The storage section 60 is a nonvolatile memory such as a flash memory or an EEPROM, and stores the control program and configuration information 61 used by the control section 30 for the control. The configuration information 61 includes threshold values used in the processing by the control section 30. The threshold values are each a threshold value for the distance used to determine whether or not coordinates of two different points on the screen SC pointed by a single first pointing element 70 are treated as the same coordinates. The storage section 60 stores two threshold values, namely a threshold value for an upper part and a threshold value for a lower part. The threshold value for the upper part is the threshold value used in the case in which the first pointing element 70 points an upper area (a second position) in the case of dividing the screen SC into two areas in the middle in the vertical direction. Further, the threshold value for the lower part is a threshold value used in the case in which a lower area (a first position) of the screen SC is indicated by the first pointing element 70. The threshold value for the lower part is set to a higher value than the threshold value for the upper part.

It should be noted that the threshold values used for the determination are not limited to the two values respectively for the upper part and the lower part. For example, it is also possible to divide the screen SC into three areas, namely an upper part, a lower part, and a middle part, and use the threshold values corresponding to the respective areas. Further, it is also possible to arrange that the threshold value increases in the direction from the upper area to the lower area of the screen SC. Further, in the case in which the projector 10 including the detection section 50 and the light emitting device 100 are located in the lower part of the screen SC, it is also possible to arrange that the threshold value corresponding to the upper area of the screen SC is higher than the threshold value corresponding to the lower area. In other words, in the case in which the detection section 50 and the light emitting device 100 are located in a first direction side with respect to the screen SC (e.g., the detection section 50 and the light emitting device 100 are both located in the upper part, or located in the lower part), it is also possible to set the threshold value corresponding to the second area of the screen SC located on the opposite side to the first direction side with respect to the first area to be higher than the threshold value corresponding to the first area.

The image processing section 40 obtains the image data input through the image I/F section 12 in accordance with the control by the control section 30 to determine an attribute such as the image size, the resolution, whether the image is a still image or a moving image, the frame rate in the case in which the image is a moving image, and whether or not the image data is 3D image data, with respect to the image data thus obtained.

The image processing section 40 is connected to the frame memory 41, and develops the image data thus obtained in the frame memory 41 frame by frame. The image processing section 40 performs the image processing on the image data thus developed. The image processing section 40 performs a process such as a resolution conversion process, a gamma correction process, a color shading correction process, a luminance correction process, or a shape correction process as the image processing. Further, it is obviously possible for the image processing section 40 to perform two or more of the processes described above in combination with each other.

The image processing section 40 reads out the image having been processed from the frame memory 41, generates image signals of R, G, and B corresponding to the image, and then outputs the image signals to the light modulation device drive section 46.

The light modulation device drive section 46 drives the liquid crystal panels of the light modulation device 22 based on the image signal input from the image processing section 40 to draw the image.

The operation panel 17 is provided with a variety of switches and indicator lamps for the operator to perform operations. The operation panel 17 is connected to the operation detection section 18. The operation detection section 18 appropriately lights or blinks the indicator lamps of the operation panel 17 in accordance with the operation state and the setting state of the projector 10 in accordance with the control by the control section 30. When the switch of the operation panel 17 is operated, an operation signal corresponding to the switch having been operated is input to the control section 30 via the operation detection section 18.

Further, the remote control receiver 19 receives the infrared signal emitted by the remote controller (not shown). The remote control receiver 19 is connected to the operation detection section 18. The remote control receiver 19 decodes the infrared signal received from the remote controller to generate an operation signal representing the operation content in the remote controller, and then outputs the operation signal to the operation detection section 18. The operation signal generated by the remote control receiver 19 is input to the control section 30 via the operation detection section 18.

The emission device drive section 48 is connected to the light emitting device 100 via the connection section 49. The connection section 49 is, for example, a connector having a plurality of pins, and the light emitting device 100 is connected to the connection section 49 via a cable 110. The emission device drive section 48 generates a pulse signal in accordance with the control by the control section 30, and then outputs the pulse signal to the light emitting device 100 via the connection section 49. Further, the emission device drive section 48 supplies the light emitting device 100 with the electric power via the connection section 49.

As shown in FIG. 1, the light emitting device 100 is configured housing a light source section 101 and optical components in a case having a roughly box-like shape. In the light emitting device 100 according to the present embodiment, the light source section 101 is provided with a solid-state light source (not shown) for emitting the infrared light. The infrared light emitted by the solid-state light source is diffused by a collimating lens and a Powell lens to form a plane along the screen SC. Further, it is also possible to arrange that the light source section 101 is provided with a plurality of solid-state light sources, and the light emitted by each of the solid-state light sources is diffused to thereby form the layer of light so as to cover an image projection range of the screen SC. Further, it is also possible for the light emitting device 100 to be provided with an adjustment mechanism for adjusting a distance and an angle between the layer of the light emitted by the light source section 101 and the screen SC.

The light emitting device 100 lights the light source section 101 using the pulse signal and the electric power supplied from the emission device drive section 48. The timing at which the light source section 101 is put ON or OFF is controlled by the emission device drive section 48. The control section 30 controls the emission device drive section 48 to light the light source section 101 in sync with the timing at which a shooting section 51 described later performs shooting.

The detection section 50 is provided with the shooting section 51, a shooting control section 52, a transmitting section 53, a position detection section 54, and a coordinate detection section 55, and detects the operation of the first pointing element 70 and the second pointing element 80 to the screen SC.

The shooting section 51 is incorporated in the projector 10 disposed above the screen SC. The shooting section 51 has an imaging optical system, an imaging element, an interface circuit, and so on, and shoots the projection direction of the projection optical system 23. The imaging optical system of the shooting section 51 is disposed facing to roughly the same direction as the projection optical system 23, and has a field angle of defining a range including the screen SC and the periphery of the screen SC as a shooting range. Further, as the imaging element, there can be cited a CCD and a CMOS capable of receiving light in the infrared region and the visible region. The shooting section 51 can also be provided with a filter partially blocking the light entering the imaging element, and in the case where the infrared light is received, it is also possible to dispose a filter for mainly transmitting the light in the infrared region in front of the imaging element, for example. Further, the interface circuit of the shooting section 51 reads out and then outputs the detection value of the imaging element.

The shooting control section 52 makes the shooting section 51 perform shooting to form data of the shot image. When the imaging element performs shooting with visible light, the image projected on the screen SC is shot. Further, the shooting control section 52 can make the shooting section 51 shoot the infrared light, and in the data of the shot image on this occasion, there appear the infrared light (the infrared signal) emitted by the first pointing element 70, and the reflected light (detection light) which is the infrared light having been emitted by the light emitting device 100 and then reflected by the second pointing element 80.

The transmitting section 53 transmits the infrared signal to the first pointing element 70 in accordance with the control by the shooting control section 52. The transmitting section 53 has a light source such as an infrared LED, and puts ON or OFF the light source in accordance with the control by the position detection section 54.

The position detection section 54 detects the image of the light emitted by the first pointing element 70, and the image of the reflected light reflected by the second pointing element 80 from the data of the shot image input from the shooting control section 52. The position detection section 54 detects the image of the light from the data of the shot image shot in second through fourth phases described later.

The coordinate detection section 55 detects the coordinate of the position of the image of the light in the data of the shot image based on the position of the image of the light detected by the position detection section 54 from the data of the shot image in the second through fourth phases. Further, it is also possible for the coordinate detection section 55 to calculate the coordinates of the pointed positions by the pointing elements 70, 80 in the projection image projected by the projection section 20 to output the result to the control section 30. Further, it is also possible for the coordinate detection section 55 to calculate the coordinates of the pointed positions by the pointing elements 70, 80 in the image data drawn by the image processing section 40 in the frame memory 41, and the coordinates of the pointed positions by the pointing elements 70, 80 in the input image data of the image I/F section 12.

FIG. 3 is a diagram showing a communication sequence of the projector 10, the first pointing element 70, and the light emitting device 100. The projector 10 repeatedly performs the communication sequence including four phases, namely first through fourth phases, to perform communication with the first pointing element 70 and the light emitting device 100. The lengths of the respective phases are set to the same periods. Further, although the light emitting time of a single light emission operation of the transmitting section 53 is set to be one fourth of a single phase, the light emitting time of a single light emission operation of the first pointing element 70 is set to be one eighth of a single phase, and the light emitting time of a single light emission operation of the light emitting device 100 is set to be a single phase, these are illustrative only.

The first phase is a phase for synchronizing the first pointing element 70 with the projector 10. In the first phase, the transmitting section 53 of the projector 10 emits light to transmit the infrared signal for synchronization. The control section 73 of the first pointing element 70 detects the infrared signal for the synchronization in the transmitting/receiving section 74 to recognize start timing of the first phase.

The second phase is a phase for the position detection, and the light source section 101 of the light emitting device 100 and the transmitting/receiving section 74 of the first pointing element 70 are put ON. The projector 10 shoots the shooting range using the shooting section 51 in sync with the light emission timing of the light emitting device 100 and the first pointing element 70. For example, if the shooting section 51 performs shooting in the second phase, the light emitted by the first pointing element 70, and the reflected light reflected by the second pointing element 80 appear in the data of the shot image.

The shooting timing and the shooting intervals of the shooting section 51 are set in advance, and the number of times of shooting per phase can be one or more than one. In the case in which the first pointing element 70 emits light once a phase as shown in FIG. 3, it is desirable to perform shooting at at least the timing when the first pointing element 70 emits light in each phase. Further, a method of adjusting the shooting timing of the shooting section 51 and the light emission timing of each of the sections is arbitrary. Since it is generally difficult to make the shooting timing and the shooting intervals of the shooting section 51 variable inmost cases, it is advisable to adjust the light emission timing of the transmitting section 53 taking the shooting timing of the shooting section 51 into consideration.

The third phase is a phase for determining the pointing element. In the third phase, the first pointing element 70 emits light, while the light emitting device 100 does not emit light. Therefore, in the data of the shot image shot by the shooting section 51 in the third phase, the image of the light emitted by the first pointing element 70 appears, and the reflected light by the second pointing element 80 does not appear.

The four phase is a phase for the position detection similarly to the second phase, and the light source section 101 of the light emitting device 100 and the transmitting/receiving section 74 of the first pointing element 70 are put ON.

It is possible for the control section 30 of the projector 10 to tell whether the image of the light appears in the data of the shot images in the second and fourth phases is the image of the light of the first pointing element 70 or the image of the reflected light of the second pointing element 80 by comparing the data of the shot image in the third phase and the data of the shot images in the second and fourth phases with each other. Further, in the case in which a plurality of images of the light appears in the data of the shot images, it is possible to tell which one of the images of the light is the image of the light of the first pointing element 70, and which one of the images of the light is the image of the light of the second pointing element 80.

Further, in the case in which the period of each of the phases is sufficiently short, the positions of the images appearing in the data of the shot images in the consecutive second, third, and fourth phases become sufficiently close to each other. Therefore, it is easy to tell the image of the light of the first pointing element 70 and the image of the reflected light of the second pointing element 80 from each other.

Further, in the case of performing an operation using a plurality of first pointing elements 70, it is possible to identify the light emission of each of the first pointing elements 70 in the data of the shot images of the shooting section 51.

Specifically, it is sufficient to set light emission timings different from each other to the respective first pointing elements 70 in advance.

For example, in the case of assuming that the pointing elements used in the operation are the first pointing element 70A and the first pointing element 70B, lighting/non-lighting states in the third phase in four consecutive communication sequences are set in the first pointing element 70A as "1001" ("1" denotes lighting state, and "0" denotes non-lighting state). Further, the lighting/non-lighting states in the third phase in four consecutive communication sequences are set in the first pointing element 70B as "0101." In this case, the control section 30 can distinguish the first pointing element 70A and the first pointing element 703 from each other by comparing the images of the light appearing in the data of the shot images shot in the third phase of the four consecutive communication sequences with each other.

The attitude sensor 47 is formed of an acceleration sensor, a gyro sensor, or the like, and outputs the detection value to the control section 30. The attitude sensor 47 is fixed to the main body of the projector 10 so as to be able to identify the installation direction of the projector 10.

The projector 10 can be used in an installation condition for performing projection from below the screen SC, an installation condition for using a horizontal surface such as atop surface of a desk as the screen SC, and soon in addition to the suspended installation of being suspended from the wall surface or the ceiling surface shown in FIG. 1. Some installation conditions of the projector 10 are not appropriate for the use of the light emitting device 100. For example, in the case in which the projector 10 and the light emitting device 100 are installed below the screen SC to perform the projection from below the screen SC, the body of the operator blocks the light emitted from the light emitting device 100 in some cases, which is not appropriate. The attitude sensor 47 is provided to the main body of the projector 10 so as to be able to identify the plurality of installation conditions assumed as the installation condition of the projector 10. The attitude sensor 47 is configured using, for example, a dual-axis gyro sensor, a single-axis gyro sensor, or an acceleration sensor. The control section 30 can automatically determine the installation condition of the projector 10 based on the output value of the attitude sensor 47. In the case in which the control section 30 has determined that the installation condition is inappropriate for the use of the light emitting device 100, it is also possible to arrange that, for example, the emission device drive section 48 stops outputting the power supply voltage and the pulse signal.

Then, a process of each of the functional blocks provided to the control section 30 will be described.

The projection control section 31 obtains the content of the operation having been performed by the operator based on the operation data input from the operation detection section 18. The projection control section 31 controls the image processing section 40, the light source drive section 45, and the light modulation device drive section 4G in accordance with the operation performed by the operator to project the image on the screen SC.

Further, the projection control section 31 controls the image processing section 40 to perform a discrimination process between a 3D (stereoscopic) image and a 2D (planar) image described above, a resolution conversion process, a frame rate conversion process, a distortion correction process, a digital zoom process, a color correction process, a luminance correction process, and so on.

Further, the projection control section 31 controls the light source drive section 45 in accordance with the process of the image processing section 40 to thereby control the light intensity of the light source section 21.

The emission control section 32 controls the emission device drive section 48 to execute or stop output of the electric power and the pulse signal to the light emitting device 100 connected to the connection section 49. In the case in which the light emitting device 100 cannot be used or is not used, the emission control section 32 makes the emission device drive section 48 stop outputting the electric power and the pulse signal. Further, in the case of using the light emitting device 100, the emission control section 32 makes the emission device drive section 48 output the electric power and the pulse signal.

The calibration control section 33 performs the calibration. The calibration is a process for achieving association in position between the projection image projected on the screen SC and the data of the shot image shot by the shooting section 51. The calibration control section 33 performs, for example, an automatic calibration as a calibration related to the pointed position by the pointing element 70 or the pointing element 80. The automatic calibration is a process of projecting an image for the automatic calibration on the screen SC, shooting the shooting range including the screen SC with the shooting section 51, and then generating calibration data using the data of the shot image of the shooting section 51. In the image for the automatic calibration, there is displayed a plurality of marks. The calibration control section 33 associates the marks detected from the data of the shot image and the projection image drawn in the frame memory 41, namely the marks in the automatic calibration image, with each other to generate the calibration data.

Further, the calibration control section 33 can also perform a manual calibration instead of, or together with, the automatic calibration. In the case of performing the manual calibration, the calibration control section 33 projects an image for the manual calibration on the screen SC. In the image for the manual calibration, there is also displayed a plurality of marks. In the manual calibration, the operator points each of the marks in the image for the manual calibration displayed on the screen SC with the first pointing element 70 or the second pointing element 80. The calibration control section 33 detects the operation by the pointing element 70 or the pointing element 80 to the image thus projected from the data of the shot image shot by the shooting section 51 to generate the calibration data.

The detection control section 34 controls the detection section 50 to detect the operation (the coordinate of the pointed position) to the screen SC by the first pointing element 70 or the second pointing element 80.

Further, the detection control section 34 determines whether the bright point appears in the data of the shot image is the image of the light emitted by the first pointing element 70 or the image of the reflected light reflected by the second pointing element 80 based on the data of the shot images shot in the second, third, and fourth phases. Specifically, the detection control section 34 determines that the bright points, which are detected in the data of the shot images in all of the second, third, and fourth phases, and located at roughly the same positions, correspond to the pointed position by the first pointing element 70. Further, the detection control section 34 determines that the bright points, which are detected in the data of the shot images in the second and fourth phases, not detected in the data of the shot image in the third phase, and located at roughly the same positions, correspond to the pointed position by the second pointing element 80.

It should be noted that in the case in which the shooting intervals of the shooting section 51 are extremely short, the image of the light emitted by the first pointing element 70 and the image of the reflected light of the second pointing element 80 are detected at the same position in the data of the shot image shot in a single communication sequence. However, since the detection positions of the bright points are shifted from each other in some cases depending on the shooting timing, the coordinates of the bright points detected from the data of the shot image are not required to completely coincide with each other, but are only required to be roughly the same.

Further, the detection control section 34 determines whether or not the tip portion 71 of the first pointing element 70 has contact with the screen SC based on the data of the shot image in the third phase. For example, it is also possible to determine whether the first pointing element 70 and the screen SC are in the contact state or the noncontact state by changing the lighting pattern of the first pointing element 70 in the third phase. For example, it is also possible to divide the pointing element determination phase into four sections, and make the section in which the transmitting/receiving section 74 of the first pointing element 70 is put ON different between the case in which the operation switch 75 is in the ON state and the case in which the operation switch 75 is in the OFF state as shown in FIG. 3. For example, in the case in which the operation switch 75 is in the ON state, the transmitting/receiving section 74 is lit in odd sections (the first and third sections) out of the four sections, and in the case in which the operation switch 75 is in the OFF state, the transmitting/receiving section 74 of the first pointing element 70 is lit in even sections (the second and fourth sections) out of the four sections.

Further, when the detection control section 34 has determined that the coordinate detected from the data of the shot image is the coordinate of the pointed position by the first pointing element 70, the detection control section 34 determines whether or not the coordinate thus detected will be changed.

There is assumed the case of using the projection system 1 for, for example, an elementary school class. In this case, elementary school students often have muscle weakness and are unfamiliar with the first pointing element 70 having a pen-like shape. Therefore, in the case in which the student performs an operation such as drawing of characters and figures on the screen SC or selection of buttons disposed in the menu bar projected on the screen SC using the first pointing element 70, there is a high possibility that the tip portion 71 of the first pointing element 70 wobbles despite the intention. In other words, the projector 10 detects a plurality of coordinates as the pointed positions in a short period of time in some cases, which results in an unwanted operation for the student.

Therefore, in the case in which a plurality of coordinates as the pointed positions by the first pointing element 70 have been detected in a predetermined period of time, the detection control section 34 determines whether or not these coordinates are treated as the same coordinate by comparing the distances between the coordinates with a threshold value.

Further, in the case of using the projection system 1 for, for example, an elementary school class, since the students are short in height and unable to reach the upper part of the screen SC, there can be assumed the case in which the student uses the lower part of the screen SC and the teacher uses the upper part of the screen SC. Therefore, the detection control section 34 changes the threshold value used for the comparison with the distance between the coordinates described above based on whether the coordinates detected are the coordinates located in the upper part of the screen SC or the coordinates located in the lower part of the screen SC.

Figure 4:
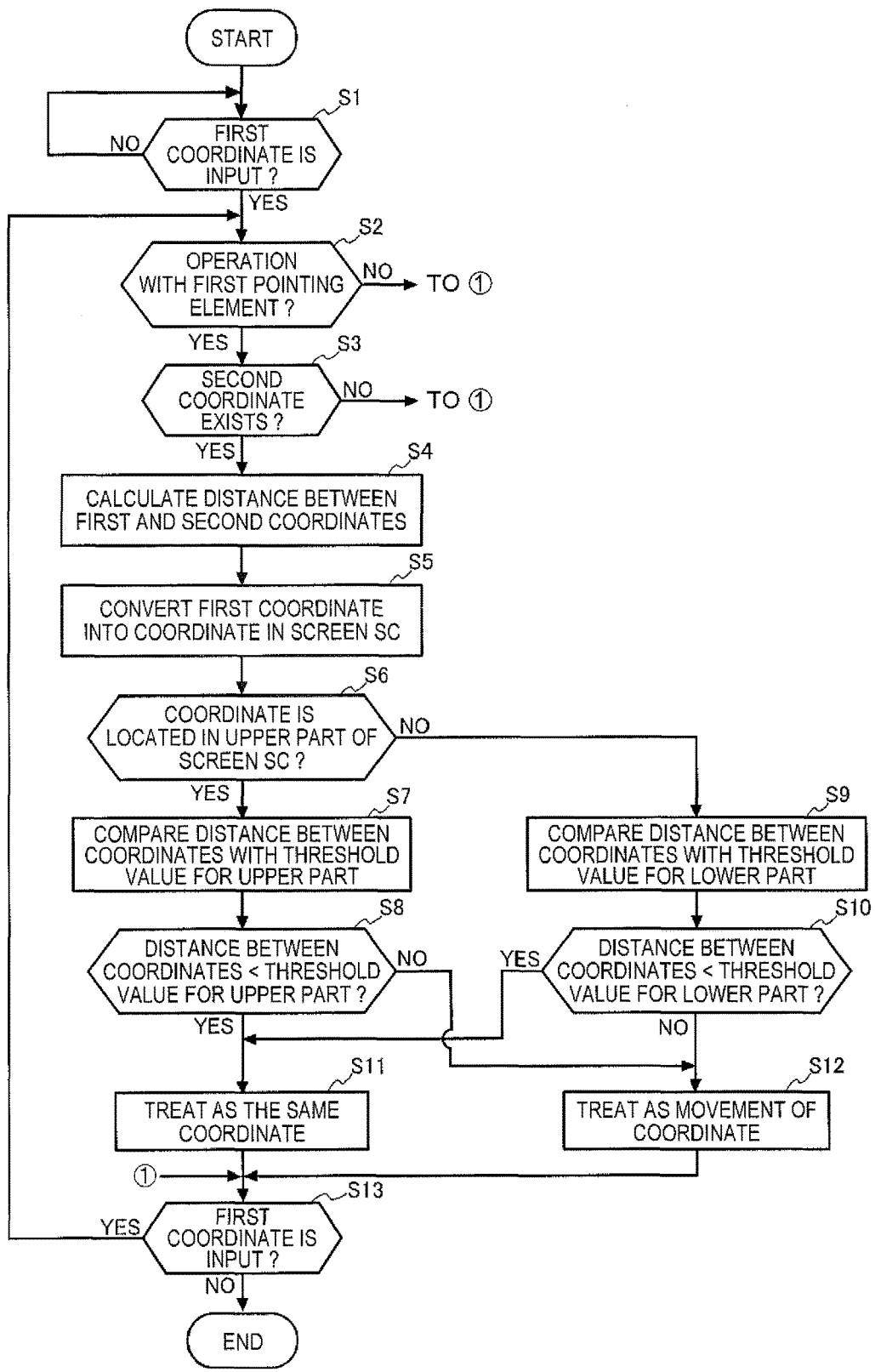
FIG. 4 is a flowchart showing a process of a control section.

FIG. 4 is a flowchart showing a processing flow for determining whether or not the coordinate of the pointed position will be changed. This processing flow will be described below with reference to FIG. 4.

When a coordinate (hereinafter referred to as a first coordinate) of a bright point appearing in the data of the shot images in the second phase and the fourth phase is input from the detection section 50 (YES in the step S1), the detection control section 34 determines (step S2) whether or not the pointing element pointing the first coordinate is the first pointing element 70. The first coordinate is a coordinate detected from the data of the shot image obtained by shooting a first operation, which is performed by the operator on the screen SC, with the shooting section 51. The determination method on whether or not the first coordinate is the coordinate pointed by the first pointing element 70 is as described above.

In the case in which a negative determination has been made in the step S2, the detection control section 34 makes the transition to a process in the step S13. The process in the step S13 will be described later.

Further, in the case in which an affirmative determination has been made in the step S2, the detection control section 34 determines (step S3) whether or not there exists a coordinate (hereinafter referred to as a second coordinate) having been pointed by the first pointing element 70 within a predetermined time before pointing of the first coordinate. The predetermined time is set to an appropriate value taking practical determination accuracy into consideration.

When the coordinate is input from the detection section 50, the detection control section 34 stores the coordinate thus input and the pointing element 70 or 80 having pointed the coordinate in a memory such as a RAM so as to be associated with each other. Further, the second coordinate is a coordinate detected from the data of the shot image obtained by shooting a second operation, which is performed by the operator on the screen SC, with the shooting section 51.

In the case in which a negative determination has been made in the step S3, the detection control section 34 makes the transition to the process in the step S13. Further, in the case in which an affirmative determination has been made in the step S3, the detection control section 34 calculates (step S4) a distance between the first coordinate and the second coordinate.

Further, in the case in which a negative determination has been made in the step 92, or a negative determination has been made in the step S3, the detection control section 34 makes the transition to the process in the step S13. In the step S13, the detection control section 34 determines whether or not the first coordinate has newly been input. In the case in which the new first coordinate has been input (YES in the step S13), the detection control section 34 returns to the step S2 to repeat the processes from the step S2 once again. Further, in the case in which the new first coordinate has not been input (NO in the step S13), the detection control section 34 terminates the processing flow.

The detection control section 34 calculates the distance between the coordinates, namely the first coordinate and the second coordinate in the step S4, and then converts (step S5) the first coordinate into a coordinate on the screen SC. The detection control section 34 calculates the data representing the range of the screen SC in the data of the shot image based on the calibration data generated by the calibration control section 33. The detection control section converts the first coordinate into the coordinate (hereinafter referred to as a third coordinate) on the screen SC based on the data representing the range of the screen SC. The detection control section 34 determines (step S6) whether the third coordinate obtained by the conversion is located in the upper part of the screen SC or located in the lower part of the screen SC. In the present embodiment, an upper area in the case of dividing the screen SC into two areas in the middle in the vertical direction is referred to as the upper part of the screen SC, and the lower area is referred to as the lower part of the screen SC.

In the case in which the detection control section 34 has determined that the third coordinate is located in the upper part of the screen SC (YES in the step S6), the detection control section 34 reads out the threshold value for the upper part of the screen SC from the storage section 60 to compare (step S7) the threshold value with the distance between the coordinates calculated in the step S4. In the case in which the distance between the coordinates is shorter than the threshold value for the upper part (YES in the step S8), the detection control section 34 changes the first coordinate to the second coordinate to treat (step S11) the first coordinate as the same coordinate as the second coordinate. Specifically, the detection control section 34 determines that an erroneous coordinate has been detected as the pointed position due to the wobble of the tip portion 71 when operating the first pointing element 70, and changes the first coordinate to the second coordinate. Further, in the case in which the distance between the coordinates is equal to or longer than the threshold value for the upper part (NO in the step S8), the detection control section 34 determines (step S12) the distance as a movement of the coordinate. In other words, the detection control section 34 determines that the pointed position by the first pointing element 70 has been changed from the second coordinate to the first coordinate.

Further, in the case in which the detection control section 34 has determined that the third coordinate is located in the lower part of the screen SC (NO in the step S6), the detection control section 34 reads out the threshold value for the lower part of the screen SC from the storage section 60 to compare (step S9) the threshold value with the distance between the coordinates calculated in the step S4. The threshold value for the lower part is set to a higher value than the threshold value for the upper part. In the case in which the distance between the coordinates is shorter than the threshold value for the lower part (YES in the step S10), the detection control section 34 changes the first coordinate to the second coordinate to treat (step S11) the first coordinate as the same coordinate as the second coordinate. Specifically, the detection control section 34 determines that an erroneous coordinate has been detected as the pointed position due to the wobble of the tip portion 71 when operating the first pointing element 70, and changes the first coordinate to the second coordinate. Further, in the case in which the distance between the coordinates is equal to or longer than the threshold value for the lower part (NO in the step S10), the detection control section 34 determines (step S12) the distance as a movement of the coordinate. In other words, the detection control section 34 determines that the pointed position by the first pointing element 70 has been changed from the second coordinate to the first coordinate.

Then, the detection control section 34 determines (step S13) whether or not the first coordinate has newly been input. In the case in which the new first coordinate has been input (YES in the step S13), the detection control section 34 returns to the step S2 to repeat the processes from the step S2 once again. Further, in the case in which the new first coordinate has not been input (NO in the step S13), the detection control section 34 terminates the processing flow.

Further, when the process of changing the coordinate detected from the data of the shot image is complete, and thus, the pointed position is fixed, the detection control section 34 generates locus data representing the movement locus of the pointed position based on the coordinates consecutively input from the detection section 50. As the locus data, the detection control section 34 generates an aggregate of the coordinates, which are the coordinates of the pointed positions pointed by a single pointing element 70 or 80, and at which the pointing element 70 or 80 is determined to have contact with the screen SC. Further, as the locus data, the detection control section 34 can also generate an aggregate of the coordinates, which are the coordinates of the pointed positions pointed by a single pointing element 70, and at which the pointing element 70 is determined not to have contact with the screen SC. It is also possible for the detection control section 34 to detect, for example, a gesture with the pointing element 70 using the locus data representing the aggregate of the coordinates at which the pointing element 70 is determined not to have contact with the screen SC.

The detection control section 34 passes the coordinate of the pointed position, the identification information representing the fact that the pointing element having pointed the coordinate is the first pointing element 70, and the information representing whether the tip portion 71 of the first pointing element 70 and the screen SC are in the contact state or in the non-contact state, to the processing section 35. Further, the detection control section 34 passes the coordinate of the pointed position and the identification information representing the fact that the pointing element having pointed the coordinate is the second pointing element 80, to the processing section 35. Further, the detection control section 34 passes the locus data, and the identification information of the pointing element 70 or 80 having pointed the locus data, to the processing section 35.

The processing section 35 performs a predetermined process based on the coordinate of the pointed position or the locus data obtained from the detection control section 34. The processing section 35 performs, for example, the function assigned to a button in the menu bar overlapping the coordinate of the pointed position thus obtained. The menu bar is an object showing a list of the selectable functions on the screen SC, and as the selectable functions, there can be cited, for example, drawing of a figure (e.g., a curved line, a straight line, a circle, an ellipse, or a quadrangle), coloring of the figure having been drawn, partial erasure of the figure having been drawn, and undoing of a process. Further, the processing section 35 performs a process of, for example, making the image processing section 40 draw a figure, characters, and symbols based on the locus data, then superimpose the figure and so on thus drawn on the input image input through the image T/F section 12, and then project the result.

Further, it is also possible for the processing section 35 to output the coordinate thus obtained to an external device such as a PC connected to the I/F section 11. In this case, it is also possible for the processing section 35 to convert the coordinate thus obtained into a data format which can be recognized as an input of a coordinate input device in the operating system of the external device connected to the I/F section 11, and then output the result. For example, in the case in which the PC operating with the Windows (registered trademark) operating system is connected to the I/F section 11, the processing section 35 outputs the data to be processed as the input data of the HID (human interface device) in the operating system.

Second Embodiment

In the present embodiment, the coordinate of the pointed position pointed by the second pointing element 80 is corrected. It should be noted that the configuration of the projector 10, the light emitting device 100, and the first pointing element 70 is the same as that of the first embodiment shown in FIG. 2, and therefore, the description thereof will be omitted.

Figure 5:
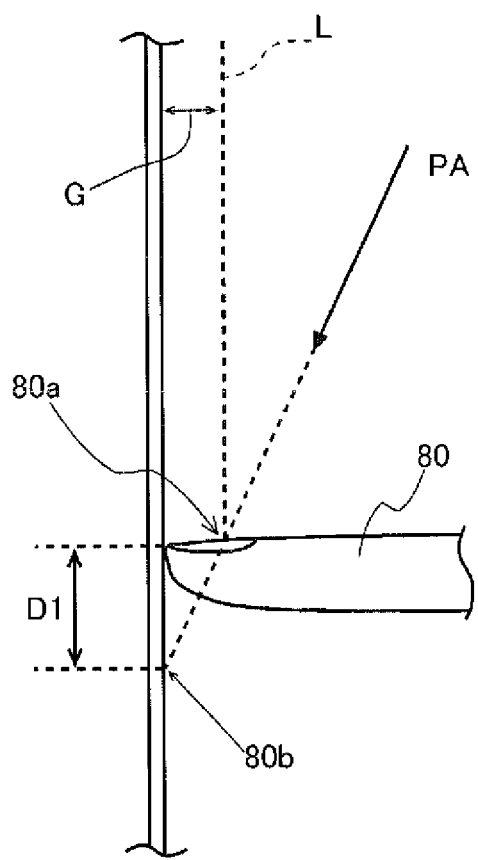
FIG. 5 is a diagram showing a state of detecting a pointed position by a second pointing element.

FIG. 5 is a diagram showing a state of detecting a pointed position by the second pointing element 80.

In the case of detecting the pointed position by the second pointing element 80, the reflected light of the infrared light L reflected by the second pointing element 80 is detected. Specifically, the image of the reflected light of the infrared light L is detected from the data of the shot image shot from the shooting direction PA. The emission direction of the infrared light L is roughly parallel to the screen SC, and the infrared light L is distant from the screen SC as much as a predetermined distance (hereinafter referred to as a distance G). Although the distance G varies in accordance with the attaching position of the light emitting device 100 to the screen SC, it is structurally difficult to reduce the distance G to zero. Therefore, in the data of the shot image shot from the shooting direction PA, there appears the image of the reflected light reflected at a reflection position 80a distant from the screen SC as much as the distance G on the tip of the second pointing element 80. The reflection position 80a is detected as a position 80b distant from the shooting section 51 in the shooting direction PA, and causes an error of a distance D1.

Figure 6:
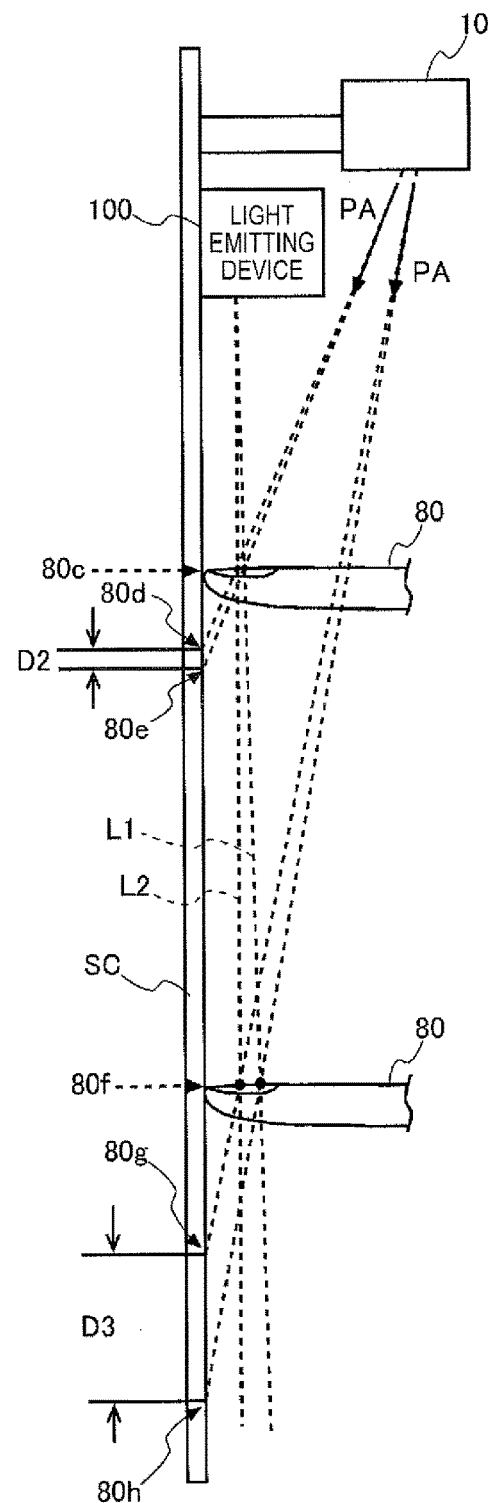
FIG. 6 is a diagram showing a state of detecting a pointed position by the second pointing element.

FIG. 6 is a diagram showing a state of detecting the pointed position by the second pointing element 80. The detection error of the pointed position caused in the case in which the infrared light L emitted from the light emitting device 100 is not parallel to the screen SC will be described.

In the case in which the screen SC is disposed oblique to the vertical direction, or in the case in which the light emitting device 100 is installed at a tilt, the infrared light L is emitted nonparallel to the screen SC in some cases. It is preferable for the infrared light L to be adjusted to be parallel to the screen SC, or in a manner that the longer the distance from the light emitting device 100 is, the shorter the distance between the infrared light L and the screen SC is. However, since the infrared light L is invisible, the infrared light L is not necessarily parallel to the screen SC in some cases.

FIG. 6 shows infrared light emitted from the light emitting device 100 and nonparallel to the screen SC as infrared light L1. Further, for the sake of comparison, infrared light emitted from the light emitting device 100 and parallel to the screen SC is shown as infrared light L2. The infrared light L1 increases in distance from the screen SC as the distance from the light emitting device 100 increases. In the present embodiment, since the light emitting device 100 is installed in the top part of the screen SC, the lower the position on the screen SC is, the longer the distance between the infrared light L2 and the screen SC is.

If the infrared light L emitted from the light emitting device 100 as the detection light is not parallel to the screen SC, it results that the error in pointed position by the second pointing element 80 detected from the data of the shot image differs depending on the position in the screen SC. For example, in FIG. 6, in the case in which the position 80c on the screen SC is pointed by the second pointing element 80, and the image of the reflected light of the infrared light L1 is shot by the shooting section 51, the reflection position is detected in the shooting direction PA as the position 80e. Further, in the case in which the position 80c on the screen SC is pointed by the second pointing element 80, and the image of the reflected light of the infrared light L2 is shot by the shooting section 51, the reflection position is detected in the shooting direction PA as the position 80d. Therefore, the error D2 shown in FIG. 6 is caused depending on whether the infrared light used for the detection of the pointed position is the infrared light L1 or the infrared light L2.

Further, in FIG. 6, in the case in which the position 80f on the screen SC is pointed by the second pointing element 80, and the image of the reflected light of the infrared light L1 is shot by the shooting section 51, the reflection position is detected in the shooting direction PA as the position 80h. Further, in the case in which the position 80f on the screen SC is pointed by the second pointing element 80, and the image of the reflected light of the infrared light L2 is shot by the shooting section 51, the reflection position is detected in the shooting direction PA as the position 80g. Therefore, the error D3 shown in FIG. 6 is caused depending on whether the infrared light used for the detection of the pointed position is the infrared light L1 or the infrared light L2. Further, the error D3 is larger than the error D2. Therefore, the further the pointed position by the second pointing element 80 is located from the shooting section 51 (the lower the pointed position on the screen SC is located), the larger the error in position detection becomes.

The detection control section 34 according to the present embodiment determines whether the third coordinate, which is obtained by converting the first coordinate pointed by the second pointing element 80 into the coordinate on the screen SC, is a coordinate included in the upper part of the screen SC, or a coordinate included in the lower part thereof.

In the case in which the detection control section 34 has determined that the third coordinate is the coordinate included in the upper part of the screen SC, the detection control section 34 does not perform any processes. In other words, the detection control section 34 does not perform the process of treating the first coordinate as the same coordinate as the second coordinate described above.

Further, if the detection control section 34 has determined that the third coordinate is the coordinate included in the lower part of the screen SC, the detection control section 34 compares the distance between the coordinates, namely the first coordinate and the second coordinate, and the threshold value with each other as described above to determine whether or not the first coordinate will be changed to the second coordinate. In the case in which the distance between the coordinates is shorter than the threshold value, the detection control section 34 changes the first coordinate to the second coordinate to treat the first coordinate as the same coordinate as the second coordinate. Further, in the case in which the distance between the coordinates is equal to or longer than the threshold value, the detection control section 34 determines that a movement of the coordinate has occurred, and then determines that the pointed position by the second pointing element 80 has been changed from the second coordinate to the first coordinate.

Further, the detection control section 34 changes the threshold value used in the comparison with the distance between the coordinates in accordance with the distance from the shooting section 51 to the first coordinate, or to the third coordinate. As described with reference to FIG. 6, the further the pointed position on the screen SC is located from the shooting section 51, the larger the error value becomes. Therefore, the threshold value is set so that the longer the distance from the shooting section 51 becomes, the higher the threshold value becomes. In other words, a range set in the first position of the screen SC is set so as to be larger than a range set in the second position closer to the shooting section 51 than the first position. For example, in the case of the configuration in which the shooting section 51 is installed in the top part of the screen SC, it is also possible to adopt the value, which is obtained by multiplying the distance from the top part of the screen SC to the first coordinate or the third coordinate by a basic threshold value, as the threshold value used for the comparison with the distance between the coordinates. The basic threshold value is a threshold value generated and then stored in the storage section 60 in advance.

Further, it is also possible to obtain the threshold value used for the comparison with the distance between the coordinates by multiplying the distance from the shooting section 51 to the first coordinate or the third coordinate by the basic threshold value. In this case, for example, it is necessary for the operator to operate the operation panel 17 to set the distance from the shooting section 51 to the upper end of the screen SC to store the distance in the storage section 60 in advance.

Although in the explanation described above, it is assumed that no process is performed in the case in which the third coordinate is the coordinate included in the upper part of the screen SC, it is also possible to compare the distance between the coordinates with the threshold value to determine whether or not the first coordinate is treated as the same coordinate as the second coordinate even in the case in which the third coordinate is the coordinate included in the upper part of the screen SC. Regarding the threshold value used in this case, it is preferable to use the value, which is obtained by multiplying the distance from the top part of the screen SC to the first coordinate or the third coordinate by the basic threshold value, as the threshold value.

As described hereinabove, the position detection device 65 of the first and second embodiments to which the invention is applied is provided with the detection section 50 and the control section 30. The detection section 50 detects an operation to the screen SC. The control section 30 identifies the pointing element 70, 80 with which the operation detected by the detection section 50 is performed, and then associates the operation and the pointing element 70, 80 with each other. Further, the control section 30 processes the operation associated with the pointing element 70, 80 out of the operations detected by the detection section 50.

Further, in the case in which a first operation and a second operation, which is performed within a predetermined period of time before the first operation, with a single pointing element are detected, and a coordinate of the first operation and a coordinate of the second operation are located within a predetermined range, the control section 30 treats the coordinate of the first operation as the same coordinate as the coordinate of the second operation. Further, the control section 30 changes the predetermined range in accordance with the detection position in the screen SC of the operation detected by the detection section 50. Therefore, it is possible to improve the operability of the operation with the pointing element 70, 80.

Further, the control section 30 determines whether or not the coordinate of the first operation is determined as the same coordinate as the coordinate of the second operation, in accordance with the configuration information 61 set so that the lower the position in the screen SC is located, the larger the predetermined range is. Therefore, in the lower part of the screen SC, it is possible to increase the possibility that the coordinates pointed with the pointing element 70, 80 are determined as the same coordinate despite the variation.

Further, the control section 30 determines whether or not the coordinate of the first operation is determined as the same coordinate as the coordinate of the second operation, in accordance with the configuration information 61 set so that the longer the distance from the detection section 50 is, the larger the predetermined range is. Therefore, even in the case in which the positions distant from the detection section 50 are pointed with the pointing element 70, 80, and there is a variation in the coordinates thus pointed, it is possible to increase the possibility that the coordinates are determined as the same coordinate.

It should be noted that the embodiments and the modified examples described above are nothing more than an example of a specific aspect to which the invention is applied, and therefore, do not limit the invention. Therefore, it is also possible to implement the invention as a different aspect. For example, the pointing element 70 is not limited to the pointing element 70 having the pen-like shape, but it is also possible to use a laser pointer, a pointer rod, and so on.

Further, although in the embodiments described above, it is assumed that the detection section 50 shoots the screen SC with the shooting section 51 to identify the position of the pointing element 70, the invention is not limited to this configuration. For example, the shooting section 51 is not limited to a device provided to the main body of the projector 10 and shooting the projection direction of the projection optical system 23. It is also possible to configure the position detection device using the shooting section 51 separated from the main body of the projector 10, and to arrange that the shooting section 51 performs shooting from the side or the front of the screen SC. Further, it is also possible to dispose a plurality of shooting sections 51 to detect the position of the pointing element 70 by the detection section 50 based on the data of the shot images by the plurality of shooting sections 51. Further, the functions of the detection control section 34 and the processing section 35 of the control section 30 can be realized as a position detection device independent of the projector 10. Further, there can also be realized a configuration in which a display device other than the projector is provided with the functions of the detection section 50, and the detection control section 34 and the processing section 35 of the control section 30 to operate the display device as the position detection device.

Further, although in the above description of the embodiments, there is described the configuration in which the signal for synchronization is transmitted from the projector 10 to the pointing element 70 using the infrared signal emitted by the transmitting section 53, the signal for synchronization is not limited to the infrared signal. For example, it is possible to adopt a configuration of transmitting the signal for synchronization with radio wave communication or ultrasonic wireless communication. This configuration can be realized by providing the transmitting section 53 for transmitting the signal with the radio wave communication or the ultrasonic wireless communication to the projector 10, and providing the similar receiving section to the pointing element 70.

Further, although in the above description of the embodiments, there is described the example of determining whether or not the tip portion 71 of the pointing element 70 is pressed against the screen SC based on the lighting pattern of the transmitting/receiving section 74, the invention is not limited to this example. For example, whether or not the tip portion 71 of the pointing element 70 is pressed against the screen SC can also be determined by detecting the image of the pointing element 70 and the image of a shadow of the pointing element 70 from the data of the shot image.

Further, although in the above description of the embodiments, the explanation is presented citing the configuration, in which the three transmissive liquid crystal panels corresponding respectively to the colors of R, G, and B are used as the light modulation device 22 for modulating the light emitted by the light source, as an example, the invention is not limited to this example. For example, it is also possible to adopt a configuration of using three reflective liquid crystal panels, or to use a system having a liquid crystal panel and a color wheel combined with each other. Further, the invention can be constituted by a system using three digital mirror devices (DMD), a DMD system having a single digital mirror device and a color wheel combined with each other, or the like. In the case of using just one liquid crystal panel or DMD as the light modulation device, the member corresponding to the combining optical system such as the cross dichroic prism is unnecessary. Further, besides the liquid crystal panel or the DMD, any light modulation devices capable of modulating the light emitted by the light source can be adopted without problems.

Further, each of the functional sections of the projector 10 shown in FIG. 2 is for showing the functional configuration, and the specific mounting forms are not particularly limited. In other words, it is not necessarily required to install the hardware corresponding individually to each of the functional sections, but it is obviously possible to adopt the configuration of realizing the functions of the plurality of functional sections by a single processor executing a program. Further, a part of the function realized by software in the embodiments described above can also be realized by hardware, or a part of the function realized by hardware can also be realized by software. Besides the above, the specific detailed configuration of each of other sections of the projector 10 can arbitrarily be modified within the scope or the spirit of the invention.

What is claimed is:

1. A position detection device comprising:
   an imaging element adapted to shoot a shooting range including a part of a display surface; and
   a central processing unit (CPU) programmed to:
   make data of a shot image shot by the imaging element;
   detect an operation to the display surface from the data of the shot image;
   identify a pointing element with which the operation detected is performed, and associate the operation and the pointing element with each other; and
   process the operation associated with the pointing element out of the operations detected,
   wherein, when a first operation and a second operation, which is performed within a predetermined period of time before the first operation, with a single pointing element are detected, and a coordinate of the first operation and a coordinate of the second operation are located within a predetermined range, the identification section treats the coordinate of the first operation as the same coordinate as the coordinate of the second operation, and
   wherein the CPU is further programmed to:
   change a predetermined range in accordance with a detection position in the display surface of the operation detected; and
   determine whether or not the coordinate of the first operation is treated as the same coordinate as the coordinate of the second operation in accordance with configuration information that includes threshold values for a distance used to determine whether or not the coordinate of the first operation and the coordinate of the second operation on the display surface pointed by the pointing element are treated as the same coordinate,
   wherein the threshold values include: (i) a first threshold value for when the pointing element points to a second position, and (ii) a second threshold value for when the pointing element points to a first position, the first threshold value being set to a higher value than the second threshold value.

2. The position detection device according to claim 1, wherein
   the configuration information is set so that the range set to the first position in the display surface is larger than the range set to the second position, which is located above the first position.

3. The position detection device according to claim 1, wherein
   the configuration information is set so that the range set to the first position in the display surface is larger than the range set to the second position, which is located closer to the imaging element than the first position.

4. The position detection device according to claim 3, further comprising:
   a light emitting device installed in a top part of the display surface, and adapted to emit detection light used to detect the pointing element,
   wherein the imaging element is installed in the top part of the display surface, and shoots the detection light reflected by the pointing element, with which the operation to the display surface is performed, to detect the operation to the display surface with the pointing element.

5. A display device comprising:
   a display section adapted to display an image on a display surface;
   an imaging element adapted to shoot a shooting range including a part of the display surface; and
   a central processing unit (CPU) programmed to:
   make data of a shot image shot by the imaging element;
   detect an operation to the display surface from the data of the shot image;
   identify a pointing element with which the operation detected is performed, and associate the operation and the pointing element with each other; and
   process the operation associated with the pointing element out of the operations detected,
   wherein, when a first operation and a second operation, which is performed within a predetermined period of time before the first operation, with a single pointing element are detected, and a coordinate of the first operation and a coordinate of the second operation are located within a predetermined range, the identification section treats the coordinate of the first operation as the same coordinate as the coordinate of the second operation, and wherein the CPU is further programmed to:

change a predetermined range in accordance with a detection position in the display surface of the operation detected; and determine whether or not the coordinate of the first operation is treated as the same coordinate as the coordinate of the second operation in accordance with configuration information that includes threshold values for a distance used to determine whether or not the coordinate of the first operation and the coordinate of the second operation on the display surface pointed by the pointing element are treated as the same coordinate, wherein the threshold values include: (i) a first threshold value for when the pointing element points to a second position, and (ii) a second threshold value for when the pointing element points to a first position, the first threshold value being set to a higher value than the second threshold value.

6. A method of controlling a position detection device, comprising:

shooting, by an imaging element, a shooting range including a part of a display surface; and making data of a shot image shot by the imaging element;

detecting an operation to the display surface from the data of the shot image;

identifying a pointing element with which the operation detected in the detecting is performed, and associating the operation and the pointing element with each other;

processing the operation associated with the pointing element out of the operations detected in the detecting, wherein, when a first operation and a second operation, which is performed within a predetermined period of time before the first operation, with a single pointing element are detected, and a coordinate of the first operation and a coordinate of the second operation are located within a predetermined range, the coordinate of the first operation is treated as the same coordinate as the coordinate of the second operation in the associating, and a predetermined range is changed in accordance with a detection position in the display surface of the operation detected in the detecting; and determining whether or not the coordinate of the first operation is treated as the same coordinate as the coordinate of the second operation in accordance with configuration information that includes threshold values for a distance used to determine whether or not the coordinate of the first operation and the coordinate of the second operation on the display surface pointed by the pointing element are treated as the same coordinate, wherein the threshold values include: (i) a first threshold value for when the pointing element points to a second position, and (ii) a second threshold value for when the pointing element points to a first position, the first threshold value being set to a higher value than the second threshold value.

* * * * *